(12) United States Patent
Werner et al.

(10) Patent No.: US 9,401,597 B2
(45) Date of Patent: Jul. 26, 2016

(54) METHOD AND DEVICE FOR DISCHARGING AN INTERMEDIATE CIRCUIT OF A POWER SUPPLY NETWORK

(71) Applicant: Robert Bosch GmbH, Stuttgart (DE)

(72) Inventors: Tobias Werner, Fellbach (DE); Stefan Mangold, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 495 days.

(21) Appl. No.: 13/748,900

(22) Filed: Jan. 24, 2013

(65) Prior Publication Data

US 2013/0200731 A1 Aug. 8, 2013

(30) Foreign Application Priority Data

Feb. 8, 2012 (DE) .......................... 10 2012 201 827

(51) Int. Cl.
| | | |
|---|---|---|
| B60L 1/00 | (2006.01) | |
| B60L 3/00 | (2006.01) | |
| H02G 3/00 | (2006.01) | |
| H02H 5/12 | (2006.01) | |
| B60L 3/04 | (2006.01) | |

(52) U.S. Cl.
CPC ............... *H02H 5/12* (2013.01); *B60L 3/0046* (2013.01); *B60L 3/0092* (2013.01); *B60L 3/04* (2013.01)

(58) Field of Classification Search
CPC ..... B60L 3/0046; B60L 11/1811; B60L 3/04; B60L 3/0092; H02H 5/12; Y02T 10/6239
USPC .......................................... 307/9.1, 10.1, 326
See application file for complete search history.

(56) References Cited

U.S. PATENT DOCUMENTS

| | | | | |
|---|---|---|---|---|
| 2009/0268354 A1* | 10/2009 | Kaplan | ................ | B60L 3/0023 361/15 |
| 2011/0031939 A1* | 2/2011 | Funaba | ................. | B60K 6/445 320/166 |
| 2011/0050136 A1* | 3/2011 | Sumi | ....................... | B60L 3/04 318/400.3 |
| 2011/0093148 A1* | 4/2011 | Kuehner et al. | ................. | 701/22 |
| 2012/0019178 A1* | 1/2012 | Kono | ....................... | B60L 3/04 318/400.3 |
| 2012/0091792 A1* | 4/2012 | Wu | .......................... | B60L 1/00 307/10.1 |

FOREIGN PATENT DOCUMENTS

| | | |
|---|---|---|
| CN | 101091305 A | 12/2007 |
| DE | 102009055053 | 6/2011 |

* cited by examiner

*Primary Examiner* — Rexford Barnie
*Assistant Examiner* — Rasem Mourad
(74) *Attorney, Agent, or Firm* — Michael Best & Friedrich LLP

(57) ABSTRACT

The present invention relates to a method (100) and a device for discharging an intermediate circuit (9) of a power supply network (10), in particular a high-voltage network, wherein a consumer (7) can be connected to the power supply network (10). A first (11) and a second (12) discharge circuit for discharging the intermediate circuit (9) are provided. In a first step, the intermediate circuit (9) is discharged at least partially by means of the first discharge circuit (11) and, in a subsequent second step (104), the intermediate circuit (9) is further discharged (104) by means of the second discharge circuit (12).

13 Claims, 3 Drawing Sheets

METHOD AND DEVICE FOR DISCHARGING AN INTERMEDIATE CIRCUIT OF A POWER SUPPLY NETWORK

BACKGROUND OF THE INVENTION

Power supply networks with intermediate circuits, in particular DC intermediate circuits, are known from their use in vehicles powered by electricity. The power supply networks are used, for example, to couple batteries and electrical machines, in particular engines. The DC voltage is here transferred, for example, from the battery in the power supply network to an inverter and converted into a multi-phase AC voltage to supply the electrical machine. Current and voltage peaks occur during the switching procedures required for this. In order to form an energy buffer and hence attenuate these current peaks and voltage peaks, an intermediate circuit capacitor is provided, for example, between the battery and the inverter. Once the vehicle has stopped operating, the battery is decoupled from the power supply network by means of switches. When the consumers connected to the power supply network are also switched off and no longer consume energy, the charging energy remains in the intermediate circuit capacitor. A voltage, in particular a high voltage, is thus present at the power supply network and hence at the conductive parts to which the intermediate circuit capacitor is connected. The power supply network, in particular the DC power supply network that is connected directly to the intermediate circuit capacitor, is termed an intermediate circuit. It is desirable that, once a vehicle has stopped operating, there is no longer any voltage at the power supply network of the vehicle or the voltage that is present is below at least one predeterminable voltage value, so that there is no longer any risk for passengers and maintenance operatives or the emergency services. To this end, a method is known from DE 10 2009 055 053 for discharging the intermediate circuit capacitor in a high-voltage network by means of a discharge circuit.

SUMMARY OF THE INVENTION

The present invention provides an improved method for discharging an intermediate circuit of a power supply network, in particular a high-voltage network. A consumer can be connected to the power supply network. A first and a second discharge circuit for discharging the intermediate circuit are provided. In a first step, the intermediate circuit is discharged at least partially by means of the first discharge circuit. In a subsequent second step, the intermediate circuit is further discharged by means of the second discharge circuit.

The two discharge circuits are configured in sequence, in particular independently of each other. The intermediate circuit is thus advantageously reliably discharged. Even in the event of a fault in the first discharge circuit, the intermediate circuit is discharged by means of the redundant second discharge circuit.

In one embodiment of the invention, the first step of discharging the intermediate circuit is performed by means of the first discharge circuit as a function of an accident identification signal being detected.

When the invention is used in vehicles, it is necessary that the electrical energy is consumed from the intermediate circuit as quickly as possible after an accident too, i.e. the intermediate circuit is discharged. It is thereby prevented that members of the emergency services arriving on the scene are endangered by live parts. Therefore the method is advantageously carried out when an accident is identified, for example when an accident identification signal is detected, in particular an airbag triggering signal. Reliable discharging by means of the redundant discharge circuits until the emergency services arrive on the scene is thus ensured.

In one embodiment of the invention, the intermediate circuit is discharged by means of the second discharge circuit after a predeterminable period of time has elapsed. Depending on the design of the electronic circuit of the power supply network and of the first discharge circuit, the period of time is determined in such a way that a desired proportion of the charge is discharged by means of the first discharge circuit. After the period of time has elapsed, in particular immediately after it has elapsed, the second discharge circuit is activated and the proportion of charge still present in the power supply network is discharged. The use of both discharge circuits is thus advantageously always ensured, and hence the live parts are reliably discharged too.

In one embodiment of the invention, the second step is performed as a function of the magnitude of the voltage of the intermediate circuit.

Before the discharging by means of the second discharge circuit begins, the intermediate circuit voltage is detected, for example at the intermediate circuit capacitor, for this purpose. This can take place, for example, by means of a voltage sensor or a hardware circuit, for example by means of a voltage divider and a transistor. Discharging by means of the second discharge circuit is advantageously prevented, for example, by means of this embodiment if the voltage is so low that no danger results from this. On the other hand, a discharging by means of the second discharge circuit takes place, for example, by means of this embodiment only when the voltage lies within a range where the second discharge circuit is not damaged, for example owing to excessively high voltages.

In one embodiment, the second step is performed when the magnitude of the voltage of the intermediate circuit exceeds a predeterminable value.

In this embodiment, the second discharge circuit is used only when the discharging of the intermediate circuit by means of the first discharge circuit has been insufficient. The voltage in the intermediate circuit is still so high that no danger results from it. The intermediate circuit is advantageously then further discharged by means of the second discharge circuit.

The present invention also provides an improved device for discharging an intermediate circuit of a power supply network, in particular a high-voltage network. A consumer can be connected to the power supply network. A first and a second discharge circuit for discharging the intermediate circuit are provided. Means, in particular a control apparatus with a hardware control system or a software control system are also provided that activate the discharge circuits for discharging the intermediate circuit. This happens in such a way that, in a first step, the intermediate circuit is at least partially discharged by means of the first discharge circuit and, in a subsequent second step, the intermediate circuit is further discharged by means of the second discharge circuit.

The two discharge circuits have independently designed circuitry. Reliable discharging of the intermediate circuit is advantageously thus possible. Even in the event of a fault in the first discharge circuit, the second, in particular redundant, further discharge circuit for discharging the intermediate circuit is provided.

In one embodiment of the invention, at least one first resistor is provided for the discharging of the intermediate circuit by means of the first discharge circuit, and at least one second resistor is provided for the discharging by means of the second discharge circuit. Two in particular redundant resistors for independently discharging the intermediate circuit are thus provided. Redundant discharging of the intermediate circuit is advantageously thus enabled.

In one embodiment of the invention, the second discharge circuit for discharging the intermediate circuit comprises structural elements of a consumer that is connected to the power supply network.

The use of structural elements of consumers of the power supply network for discharging by means of the second discharge circuit is thus provided. No or fewer additional resistors or impedances for providing the in particular redundant second discharge circuit are advantageously thus provided. Costs are thus reduced, as is the structural space required.

In one embodiment of the invention, at least one switch is provided to electrically couple the consumer to the power supply network and disconnect it. The second discharge circuit can be disconnected from the power supply network by means of the switch whilst the intermediate circuit is being discharged by means of the first discharge circuit, and coupled to the power supply network by means of the second discharge circuit in order to discharge the intermediate circuit. The electronic components of the connectable consumer are advantageously thus used as components of the second discharge circuit.

In one embodiment of the invention, multiple switches are provided that are arranged and can be activated in such a way that a multi-phase consumer can be supplied with AC from the power supply network.

When, for example, six switches in the form of three half bridges are used and interconnected, they form an inverter. When the vehicle is operating, the DC is converted, for example by means of this inverter, into AC for supplying the electrical machine. The use of the structural elements of an inverter to electrically couple and disconnect an in particular multi-phase consumer is advantageously thus enabled.

In one embodiment of the invention, the consumer comprises an electrical machine. In this embodiment, a multi-phase, in particular three-phase, electrical machine is, for example, connected to the power supply network via an inverter. The structural elements of the electrical machine advantageously thus serve as resistors or impedances of the second discharge circuit for discharging the intermediate circuit.

The invention also provides a drive train for a vehicle with a device for discharging an intermediate circuit of a power supply network. A first and a second discharge circuit for discharging the intermediate circuit are provided. Means are also provided that activate the discharge circuits for discharging the intermediate circuit. This happens in such a way that, in a first step, the intermediate circuit is discharged at least partially by means of the first discharge circuit and, in a subsequent second step, the intermediate circuit is further discharged by means of the second discharge circuit.

A drive train is thus created with conductive parts that, after the vehicle has stopped operating or after an accident, are discharged, in particular redundantly, reliably by means of the two discharge circuits.

It should be understood that the features, characteristics and advantages of the method according to the invention can be applied in a corresponding fashion to the device according to the invention, and vice versa, or to the drive train.

Other features and advantages of embodiments of the invention are apparent from the following description with reference to the attached drawings.

Other possible embodiments and developments and implementations of the invention also comprise combinations not been explicitly mentioned of features of the invention described above or below.

DETAILED DESCRIPTION

Figure 1:
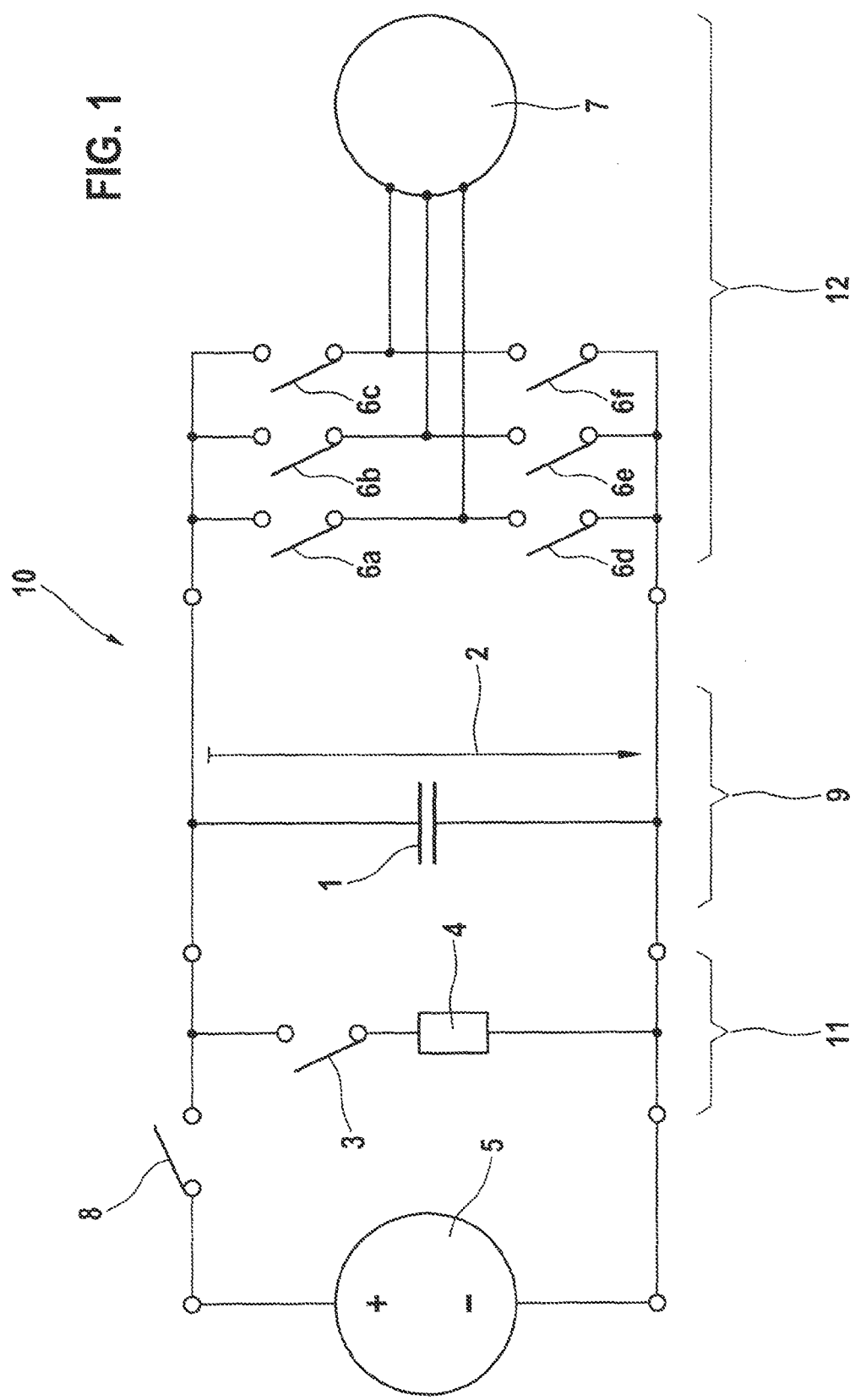
FIG. 1 shows schematically a device according to the invention for discharging an intermediate circuit of a power supply network

FIG. 1 shows schematically a device according to the invention for discharging an intermediate circuit 9 of a power supply network 10. The intermediate circuit 9 hereby essentially consists of the intermediate circuit capacitor 1 and in particular the directly connected connection cables. The power supply network 10 is an electric circuit that serves to transfer electrical energy of a connectable energy store 5, in particular a battery or an energy source, for example a fuel cell, to a connectable consumer 7. The energy store 5 for supplying the power supply network 10 can be connected by means of the switch 8. The energy store 5 is uncoupled from the power supply network 10 by means of the switch 8 before the intermediate circuit 9 is discharged. An inverter is formed by means of the switches 6a to 6f. For this purpose, the six switches 6a to 6f are arranged in such a way that they form half bridges, connected in parallel, each with two controllable switches. A half bridge power take-off, which is in each case connected to a phase conductor of the connected consumer 7, is formed between each pair of switches. As is known from the prior art, freewheeling diodes (not shown), which allow current to flow in the opposite direction, are in each case connected in parallel to the switches 6a to 6f. An electrical multi-phase, in particular three-phase, consumer, in particular an electrical machine 7, can be connected to the power supply network by means of the inverter or these switches 6a to 6f. The intermediate circuit capacitor 1 is arranged in parallel in the power supply network 10 between the switches 6a to 6f and the connected energy store 5. The intermediate circuit voltage 2 falls off at the intermediate circuit capacitor 1. A first discharge circuit 11, which comprises a resistor 4 for discharging the intermediate circuit 9, is arranged in parallel with the intermediate circuit capacitor 1. The first discharge circuit 11 also comprises a switch 3 that is closed in order to discharge the intermediate circuit 9. While the vehicle is operating, the switch 3 remains open. A second discharge circuit 12 is likewise arranged in parallel with the intermediate circuit capacitor 1. The second discharge circuit 12 also comprises a resistor or impedance 7 for discharging the intermediate circuit 9. The second discharge circuit 12 also comprises at least one switch 6 (not shown) that is closed in order to discharge the intermediate circuit 9 via the resistors 7. While the vehicle is operating, the switch 6 remains open. In the exemplary embodiment shown, the second discharge circuit 12 comprises structural elements of the consumer connected to the power supply network. An electrical machine 7 is connected as a consumer to the power supply network 10 by means of an inverter with the switches 6a to 6f. In particular, the connection cables and the copper windings of the electrical machine 7 hereby serve as resistors or impedances of the second discharge circuit 12 for discharging the intermediate circuit 9. The second discharge circuit 12 that is shown also comprises multiple switches 6a to 6f that are closed at least partially in order to discharge the intermediate circuit 9. The switches 6d to 6f are closed in particular in order to discharge the intermediate circuit 9. Alternatively, the switches 6a to 6c can also be closed in order to discharge the intermediate circuit 9. These switch positions are also termed active lower or upper short-circuits of the electrical machine 7. While the vehicle is operating, the switches 6a to 6f are activated in such a way that a multi-phase, in particular three-phase, AC voltage for supplying the electrical machine 7 with energy is generated from the DC voltage of the energy store 5. Alternatively, the electrical machine 7 can also operate as a generator and DC voltage can be generated from the AC voltage by means of the inverter, with which the energy store 5 is charged.

Figure 2:
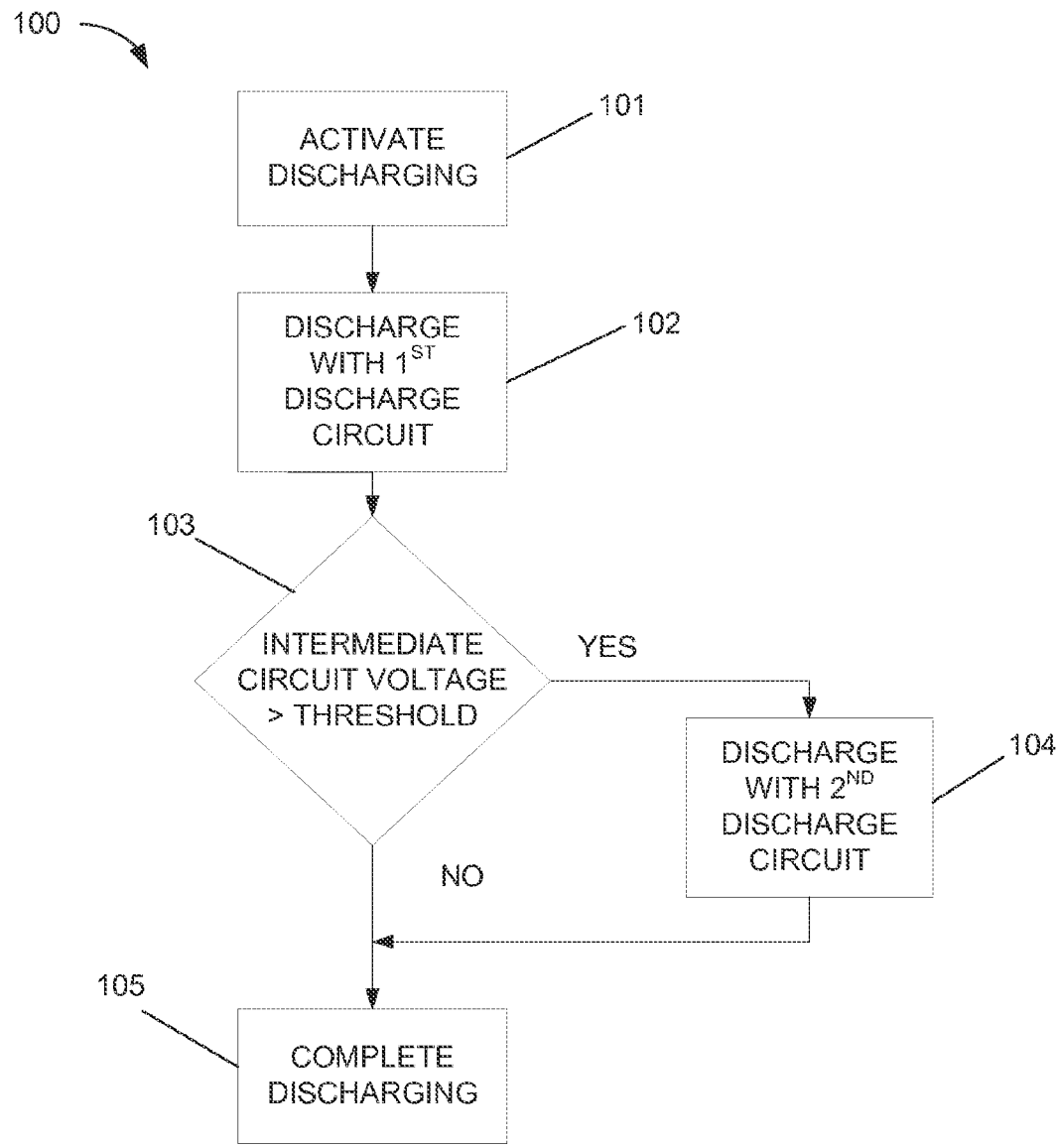
FIG. 2 shows schematically a method according to the invention for discharging an intermediate circuit of a power supply network

FIG. 2 shows schematically a method 100 according to the invention for discharging an intermediate circuit 9 of a power supply network 10. The activation of the discharging method is shown by the block 101. The energy store 5 is thus, for example, disconnected from the power supply network 10 by means of the switch 8. The discharging method can be activated in particular when an accident identification signal (not shown in the drawings) is detected. In a subsequent first step 102, the intermediate circuit 9 is at least partially discharged by means of the first discharge circuit 11. The discharging by means of the first discharge circuit 11 is here started by closing the switch 3. The switch 3 is opened in order to end the discharging procedure by means of the first discharge circuit 11. In a second step 104, the intermediate circuit 9 is further discharged by means of the second discharge circuit 12. The discharging by means of the second discharge circuit 12 is here started by closing one or more of the switches 6 or 6a-6f. Finally, in particular the switch 6 or the switches 6a-6f are opened to end the discharging procedure by means of the second discharge circuit 12. In one embodiment, the second step 104 is implemented when the first step 102 has been implemented for a predeterminable period of time. Likewise, for example, the second step is implemented as a function 103 of the magnitude of the intermediate circuit voltage. If the magnitude of the intermediate circuit voltage lies within a predetermined range or above a predeterminable value, the method branches in step 103 directly to the second step 104 and then to the completion of the discharging method in block 105. If the magnitude of the intermediate circuit voltage does not lie within a predetermined range or lies below a predeterminable value, the method branches in step 103 directly to the completion of the discharging method 105. The end of the discharging method is characterized in particular by the open switches 3 and 6 or 6a-6f.

Figure 3:
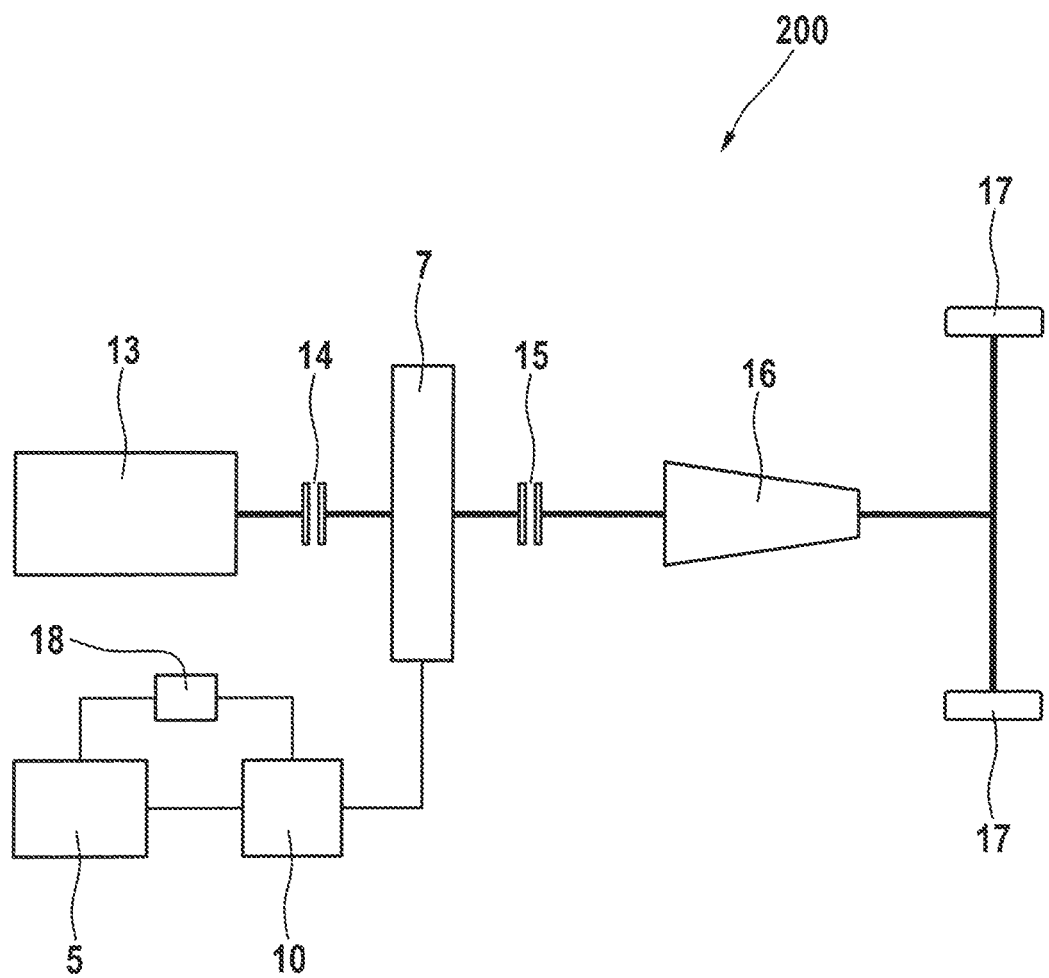
FIG. 3 shows schematically a drive train according to the invention for a vehicle with a device for discharging an intermediate circuit (9) of a power supply network Unless otherwise stated, identical elements, features and components and those having the same function are each provided with the same reference numerals. It should be understood that, for reasons of clarity, components and elements in the drawings have not necessarily been reproduced to scale.

FIG. 3 shows schematically a drive train 200 according to the invention. Two drive units, an internal combustion engine 13 and an electrical machine 7 are provided by way of example for the drive train. The drive units 7, 13 can be coupled together mechanically by means of the clutch 14. The rotational movement and the torque of the drive units are transferred to a gearbox 16 by means of the clutch 15. The gearbox 16 is coupled on the output side to the drive wheels 17. Means 18, in particular a controller, are provided in order to activate the circuits of the energy store 5 and the discharge circuits 11 and 12 of the power supply network 10.

The invention claimed is:

1. A method (100) for discharging an intermediate circuit (9) of a power supply network (10) of a vehicle, wherein a consumer (7) can be connected to the power supply network (10), characterized in that a first (11) and a second (12) discharge circuit for discharging the intermediate circuit (9) are provided and, the intermediate circuit (9) is discharged at least partially by the first discharge circuit (11) and, subsequently, the first discharge circuit is opened and the intermediate circuit (9) is further discharged (104) by the second discharge circuit (12).

2. The method according to claim 1, characterized in that the discharging (102) the intermediate circuit (9) is performed by the first discharge circuit (11) based on detection of an accident identification signal.

3. The method according to claim 1, characterized in that the intermediate circuit (9) is discharged (104) by the second discharge circuit (12) after a predeterminable period of time has elapsed.

4. The method according to claim 1, characterized in that the further discharging (104) of the intermediate circuit (9) by the second discharge circuit (12) is performed based on the magnitude of the voltage (2) of the intermediate circuit.

5. The method according to claim 4, characterized in that the further discharging (104) of the intermediate circuit (9) by the second discharge circuit (12) is performed when the magnitude of the voltage (2) of the intermediate circuit exceeds a predeterminable value.

6. The method according to claim 1, characterized in that the power supply network (10) is a high-voltage network.

7. A device for discharging an intermediate circuit (9) of a power supply network (10) of a vehicle, wherein a consumer (7) can be connected to the power supply network (10), characterized in that a first (11) and a second (12) discharge circuit for discharging the intermediate circuit (9) are provided, and in that the discharge circuits (11, 12) for discharging the intermediate circuit (9) are activated in such a way that the intermediate circuit (9) is at least partially discharged by the first discharge circuit (11) and, subsequently, the first discharge circuit is opened and the intermediate circuit (9) is further discharged (104) by the second discharge circuit (12).

8. The device according to claim 7, characterized in a first resistor (4) is provided for the discharging of the intermediate circuit (9) by the first discharge circuit (11), and in that a second resistor (7) is provided for the discharging of the second discharge circuit (12).

9. The device according to claim 8, characterized in that the second discharge circuit (12) for discharging the intermediate circuit (9) comprises structural elements of a consumer (7) that is connected to the power supply network (10).

10. The device according to claim 7, characterized in that multiple switches (6a.. 6f) are provided and arranged such that the switches (6a.. 6f) can be activated in a way that a multi-phase consumer (7) can be supplied with AC power from the power supply network (10).

11. The device according to claim 7, characterized in that the consumer (7) comprises an electrical machine.

12. The device according to claim 7, characterized in that the power supply network (10) is a high-voltage network.

13. A drive train (200) for a vehicle with a device for discharging an intermediate circuit (9) of a power supply network (10) according to claim 7.

* * * * *